United States Patent
Hoofnagle et al.

(10) Patent No.: US 9,411,119 B1
(45) Date of Patent: Aug. 9, 2016

(54) CARRYING CASE FOR AN OPTICAL LAUNCH FIBER ASSEMBLY

(71) Applicant: Fluke Corporation, Everett, WA (US)

(72) Inventors: Wayne S. Hoofnagle, Kirkland, WA (US); William H. Burke, Shoreline, WA (US)

(73) Assignee: Fluke Corporation, Everett, WA (US)

(*) Notice: Subject to any disclaimer, the term of this patent is extended or adjusted under 35 U.S.C. 154(b) by 7 days.

(21) Appl. No.: 14/635,460

(22) Filed: Mar. 2, 2015

(51) Int. Cl.
*G02B 6/00* (2006.01)
*G02B 6/44* (2006.01)
*G01M 11/00* (2006.01)

(52) U.S. Cl.
CPC .............. *G02B 6/4457* (2013.01); *G02B 6/444* (2013.01); *G02B 6/4441* (2013.01); *G01M 11/30* (2013.01)

(58) Field of Classification Search
CPC .. G02B 6/3825; G02B 6/3897; G02B 6/4439; G02B 6/444; G02B 6/4441; G02B 6/4446; G02B 6/4447; G02B 6/4457; G02B 6/4471; G01M 11/30; G01M 11/33
USPC .......... 385/134–137, 147; 242/372, 378, 390, 242/603, 604, 604.1, 608, 608.4, 613, 614
See application file for complete search history.

(56) References Cited

U.S. PATENT DOCUMENTS

| | | | |
|---|---|---|---|
| 4,846,343 A | 7/1989 | Rupert | |
| 5,323,479 A | 6/1994 | Allen | |
| 5,351,868 A | 10/1994 | Beletsky et al. | |
| 7,715,679 B2 | 5/2010 | Kowalczyk et al. | |
| 8,189,984 B2 | 5/2012 | Kowalczyk et al. | |
| 9,310,275 B1 * | 4/2016 | Irving | G01M 11/33 |
| 2004/0170369 A1 | 9/2004 | Pons | |

* cited by examiner

*Primary Examiner* — Akm Enaet Ullah
*Assistant Examiner* — Michael Mooney
(74) *Attorney, Agent, or Firm* — Locke Lord LLP; Scott D. Wofsy; Christopher J. Capelli

(57) ABSTRACT

An enclosure for an optical launch fiber assembly is disclosed which includes a base portion defining an inner cavity and having an interior surface, an outer peripheral wall and an exterior surface, a stationary storage spool fixedly secured to the inner surface of the base portion within the inner cavity, the storage spool having an annular wall forming an inner peripheral channel for supporting a central length of unjacketed optical launch fiber and an outer peripheral channel for supporting two end lengths of jacketed optical launch fiber, and a cover portion having an outer peripheral wall hingedly connected to the outer peripheral wall of the base portion.

27 Claims, 5 Drawing Sheets

CARRYING CASE FOR AN OPTICAL LAUNCH FIBER ASSEMBLY

BACKGROUND OF THE INVENTION

1. Field of the Invention

The subject invention is directed to an optical fiber testing device, and more particularly, to a portable carrying case for housing and readily accessing an optical launch fiber assembly used in conjunction with optical test equipment.

2. Description of Related Art

A test or launch fiber kit is typically utilized to test, qualify and evaluate the transmission characteristics of optical systems, optical networks or optical equipment. Examples of transmission characteristics include loss, length, time delay and reflectance. Launch fiber kits are primarily intended to increase the length of optical waveguide between optical test equipment, such as an optical time domain reflectometer (OTDR), and a component of an optical network for purposes of testing and analysis.

Launch fiber kits are also used for product demonstration and training purposes, system emulation, and for equipment calibration and benchmarking. In certain circumstances, launch fiber kits have also been employed in conjunction with an optical power meter and optical light source, or related test equipment, as a jumper for loss testing.

A conventional launch fiber kit includes a length of optical waveguide suitable for use with an OTDR to test the optical time domain reflectometry characteristics of an optical network. The length of optical waveguide necessary for OTDR testing typically ranges from about 50 meters to about 5 kilometers, and the optical waveguide typically consists of a central length of unjacketed optical fiber and shorter end lengths of jacketed optical fiber. The central length of unjacketed optical fiber is substantially longer than the end lengths of jacketed optical fiber.

The optical waveguide can be continuous, or the end lengths of jacketed optical fiber can be fused to the central length of unjacketed optical fiber. Regardless, the optical waveguide is typically stored in a rigid enclosure with the central length of unjacketed optical fiber being inaccessible to the user and the end lengths of jacketed optical fiber being accessible to the user. The unjacketed optical fiber is typically stored in a separate compartment and the end lengths of jacketed optical fiber are typically wrapped together within the enclosure. The jacketed optical fiber can be unwrapped to connect the optical test equipment (i.e., OTDR) to the optical network.

The size and weight of conventional launch fiber kits, however, presents several problems in the fields. The launch fiber kit is generally too large to fit comfortably inside an OTDR transit case and must be transported separately, resulting in possible loss or misplacement of the kit. If dropped or inadvertently moved during use, the weight of the launch fiber kit can cause damage to the OTDR, to the connector adapter in the optical network, or to the components of the launch fiber kit itself. Furthermore, field installers and technicians naturally tend to prefer smaller, lightweight test equipment, if only to reduce the bulk of their portable tools.

Another problem with existing launch fiber kits is that the jacketed optical fiber and the optical connectors on the ends of the jacketed optical fiber are difficult to manage. The end lengths of jacketed optical fiber can easily become entangled as they are repeatedly unwrapped and rewrapped, thereby causing stress and damage to the optical waveguide (e.g., glass fiber) and jacket. In addition, the launch fiber kit may include a protective lid, which may be inadvertently closed and thereby damage the jacketed optical fiber or connectors. Furthermore, protective caps (e.g., dust caps) for the optical connectors are easily misplaced, thereby subjecting the connectors to possible damage from dust, dirt or debris. It would be beneficial therefore, to provide a launch fiber test kit that overcomes many of the problems associated with prior art test kits.

SUMMARY OF THE INVENTION

The subject invention is directed to a portable carrying case for an optical launch fiber assembly that overcomes many of the problems and disadvantages associate with prior art optical launch fiber test kits. The carrying case is of the size and shape that is easily held and carried by a technician in the field, and it is manufactured from a lightweight thermoformed plastic material.

The carrying case includes a base portion and a cover portion. The cover portion of the carrying case includes an outer peripheral wall with a surrounding peripheral edge. The base portion of the carrying case defines an inner cavity which has an interior surface, an outer peripheral wall having a surrounding peripheral edge, and an exterior surface. Preferably, the outer peripheral wall of the cover portion is operatively connected to the outer peripheral wall of the base portion by a flexible or living hinge.

The carrying case includes a closure mechanism for releasably securing the outer peripheral wall of the cover portion to the outer peripheral wall of the base portion. The closure mechanism is preferably a zippered closure mechanism the extends from one edge of the living hinge to the other edge of the living hinge. The zippered closure mechanism includes a first toothed portion associated with the peripheral edge of the cover portion, a second toothed portion associated with the peripheral edge of the base portion, and a slider connecting the two toothed portions. It is envisioned that alternative closure mechanisms can be utilized to releasably secure the cover portion to the base portion.

The carrying case further includes a stationary storage spool preferably manufactured from injection molded plastic components and disposed within the inner cavity of the base portion. The stationary storage spool defines an inner chamber having an inner peripheral channel for supporting a central length of unjacketed optical fiber and an outer peripheral channel for supporting two end lengths of jacketed optical fiber. The central length of unjacketed optical fiber and the two end lengths of jacketed optical fiber together form an optical launch fiber assembly.

The storage spool includes a bottom plate secured against the interior surface of the base portion of the carrying case, an annular wall extending upwardly from the bottom plate and a top plate above the annular wall and secured to the bottom plate. More particularly, cantilevered engagement tangs project upwardly from the bottom plate of the storage spool to engage corresponding apertures formed in the plate of the spool.

The inner peripheral channel of the storage spool, which supports the central length of unjacketed optical fiber, is formed between a radially inner surface of the annular wall and a plurality of spaced apart upstanding posts that are located radially inward of the annular wall. The outer peripheral channel, which supports the two end lengths of jacketed optical fiber, is formed primarily by the radially outer surface of the annular wall, together with radially outer edge portions of the bottom and top plates of the spool. The annular wall of the spool includes an arcuate opening for accommodating passage of the end lengths of jacketed optical fiber from the inner chamber of the spool to the outer peripheral channel of the spool.

The carrying case further include an injection molded retaining member or retainer that is operatively associated with the exterior surface of the base portion for securing the stationary storage spool against the interior surface of base portion within the inner cavity thereof. At least one fastener extends between the retainer and the spool to fasten the retainer and spool to one another, through the base portion of the carrying case. Preferably, two threaded fasteners fixedly secure the bottom plate of the storage spool to the retainer, through the wall of the base portion of the carrying case.

Preferably, the retainer includes an aperture or slot for receiving a support belt or strap that can be used to releasably attach the carrying case to a supporting structure, such as, for example, an optical equipment cabinet or storage rack, in close proximity to the optical network equipment to be tested. The strap could also be used to attach the carrying case to a strap or belt worn by a technician in the field.

These and other features of the optical launch fiber carrying case of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the optical launch fiber carrying case of the subject invention without undue experimentation, preferred embodiments thereof will be described in detail herein below with reference to certain figures, wherein.

DETAILED DESCRIPTION OF PREFERRED EMBODIMENTS

Figure 1:
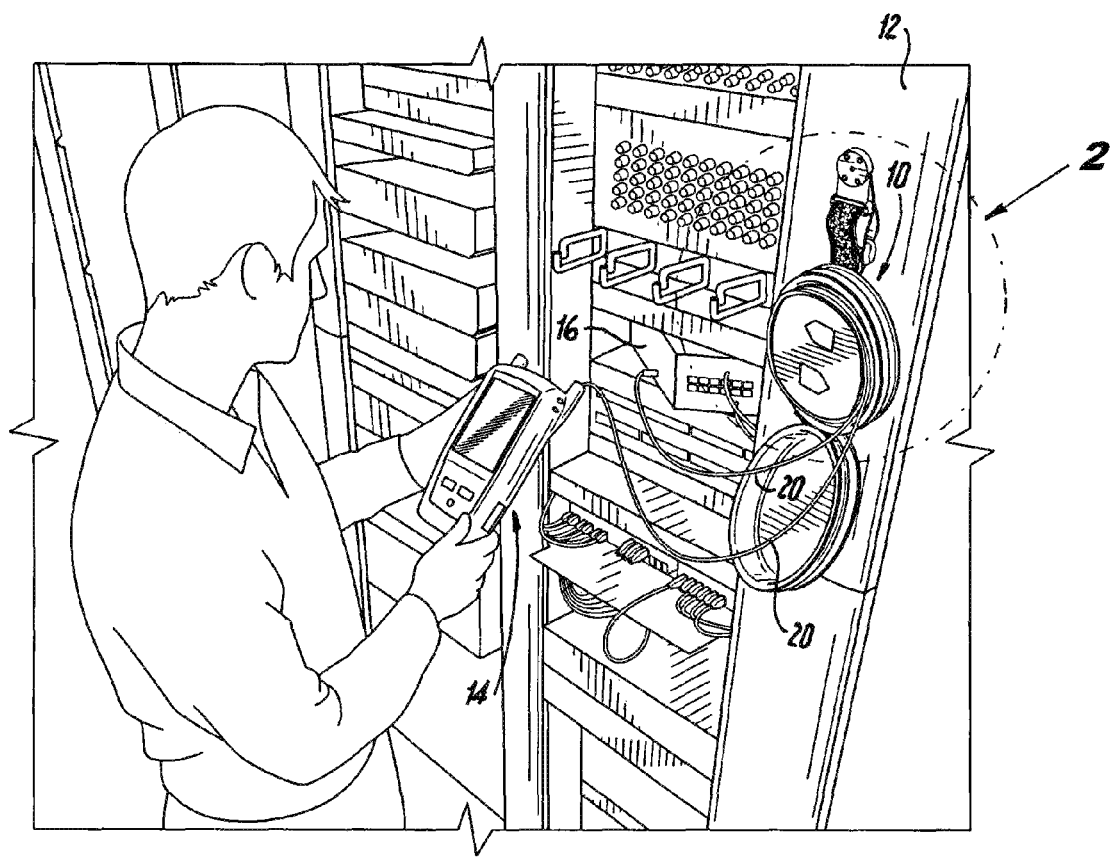
FIG. 1 is an illustration of an optical testing environment in which the launch fiber carrying case of the subject invention is shown temporarily attached to a supporting structure while being used with an optical time domain reflectometer (OTDR) to test a component of an optical network.

Referring now to the drawings, wherein like reference numerals identify similar structural features or aspects of the subject invention, there is illustrated in FIG. 1 an optical testing environment in which the launch fiber carrying case 10 of the subject invention is shown temporarily attached to a supporting structure 12 while being used in conjunction with an optical time domain reflectometer (OTDR) 14 to test, qualify and/or evaluate the transmission characteristics of a component 16 of an optical network.

Figure 2:
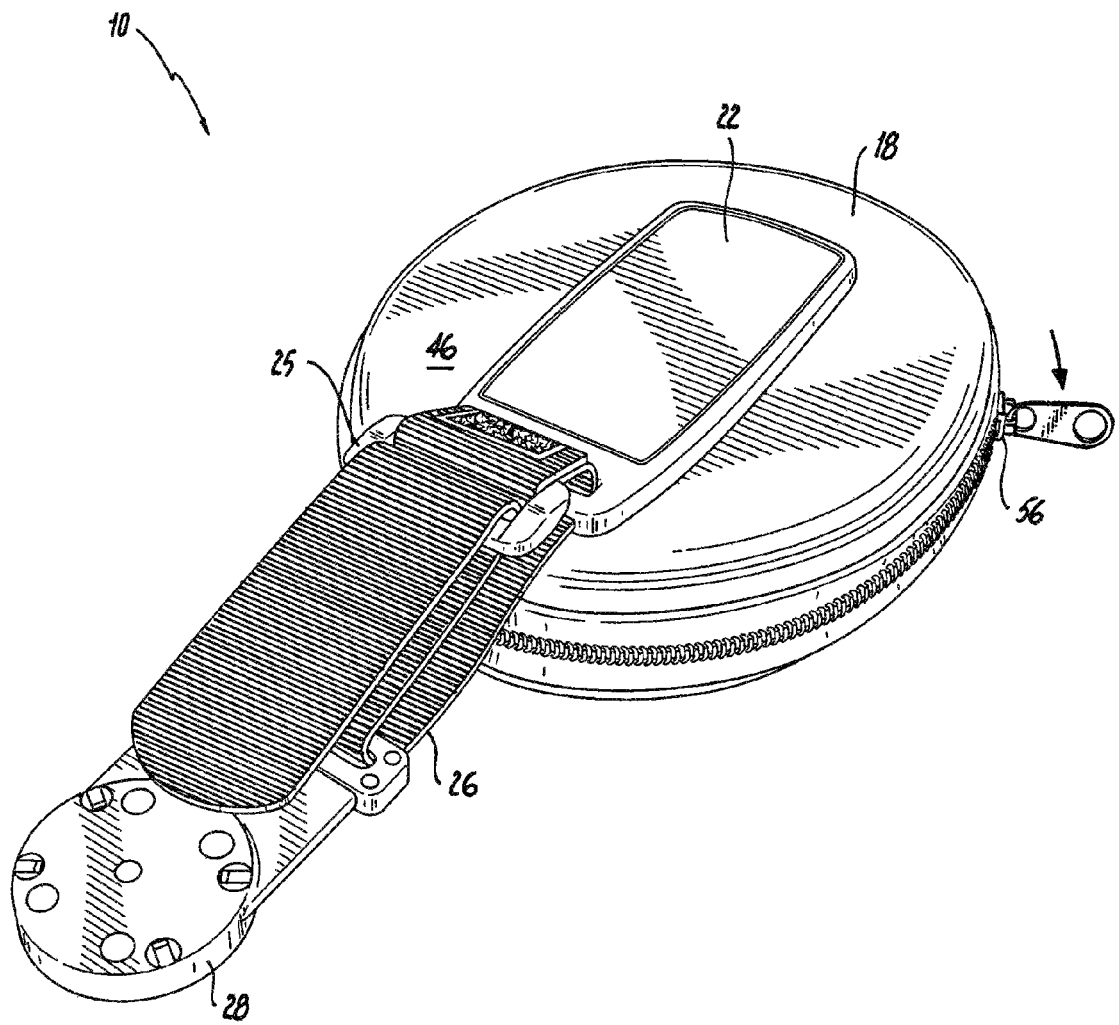
FIG. 2 is a perspective view of the launch fiber carrying case of the subject invention, as viewed from the rear, in a closed condition, showing the strap for temporarily attaching the case to a supporting structure, as shown in FIG. 1.

Referring now to FIG. 2, the portable launch carrying case 10 includes an enclosure 18 for housing an optical launch fiber assembly in a manner for ready access by a technician. The launch fiber assembly itself, which is shown in part in FIG. 1 and designated generally by reference numeral 20, will be described in greater detail below in conjunction with the internal features of the carrying case 10.

The enclosure 18 of the carrying case 10 is preferably constructed from a lightweight thermoformed plastic material, which may texturized or otherwise covered with a texturized fabric. The carrying case 10 includes a retainer 22, which is preferably formed from an injection molded plastic material. The retainer 22 includes an aperture or slot 24 for receiving a length adjustable support belt or strap 26 assembly. The belt or strap 26 preferably includes hook and loop type fastening surfaces and a buckle 25 for length adjustments. The strap 26 enables the carrying case 10 to be temporality attached to a supporting structure, such as, an optical equipment cabinet or storage rack, as shown for example in FIG. 1.

By way of example, a magnetic fastener 28 is connected to the strap 26 for releasably attaching the carrying case 10 to a metallic supporting structure. Those skilled in the art will readily appreciate however, that the strap 26 can be tethered to or otherwise engaged with a hook or similar structural feature associated with a supporting structure. It is envisioned that the strap 26 could also be used to attach the carrying case 10 to a tool belt or holster worn by a technician in the field.

Figure 3:
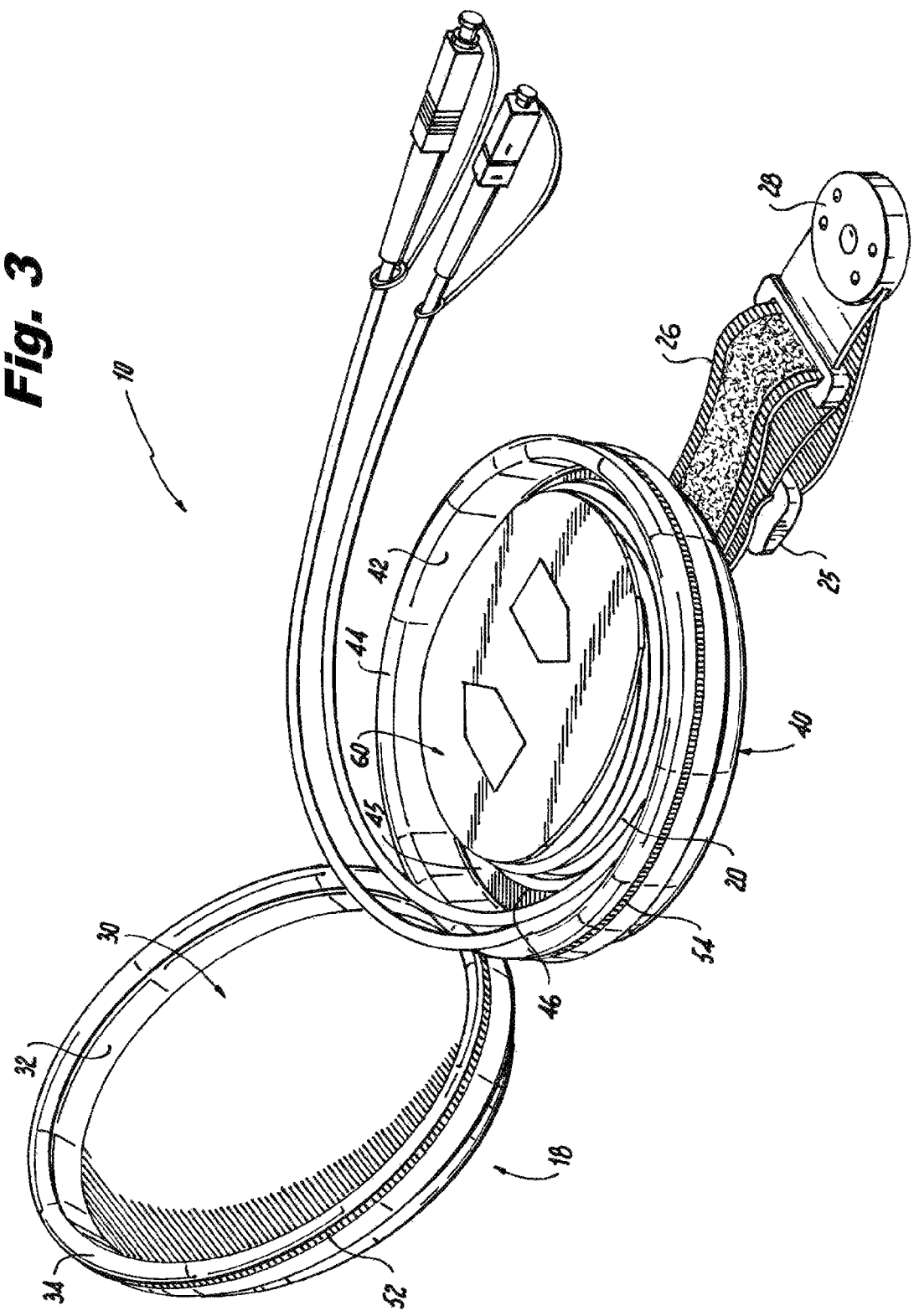
FIG. 3 is a perspective view of the optical launch fiber carrying case of the subject invention, with the cover portion opened to illustrate the stationary storage spool disposed within the case, and showing the end lengths of jacketed optical fiber.

Referring now to FIG. 3, the enclosure 18 of carrying case 10 includes a cover portion 30 having an outer peripheral wall 32 with a surrounding edge 34. The enclosure 18 of carrying case 10 further includes a base portion 40 having an outer peripheral wall 42 with a surrounding edge 44, and further defining an inner cavity 45. The inner cavity 45 includes an interior surface 46 and an exterior surface 48, which is seen in FIG. 2.

Figure 4:
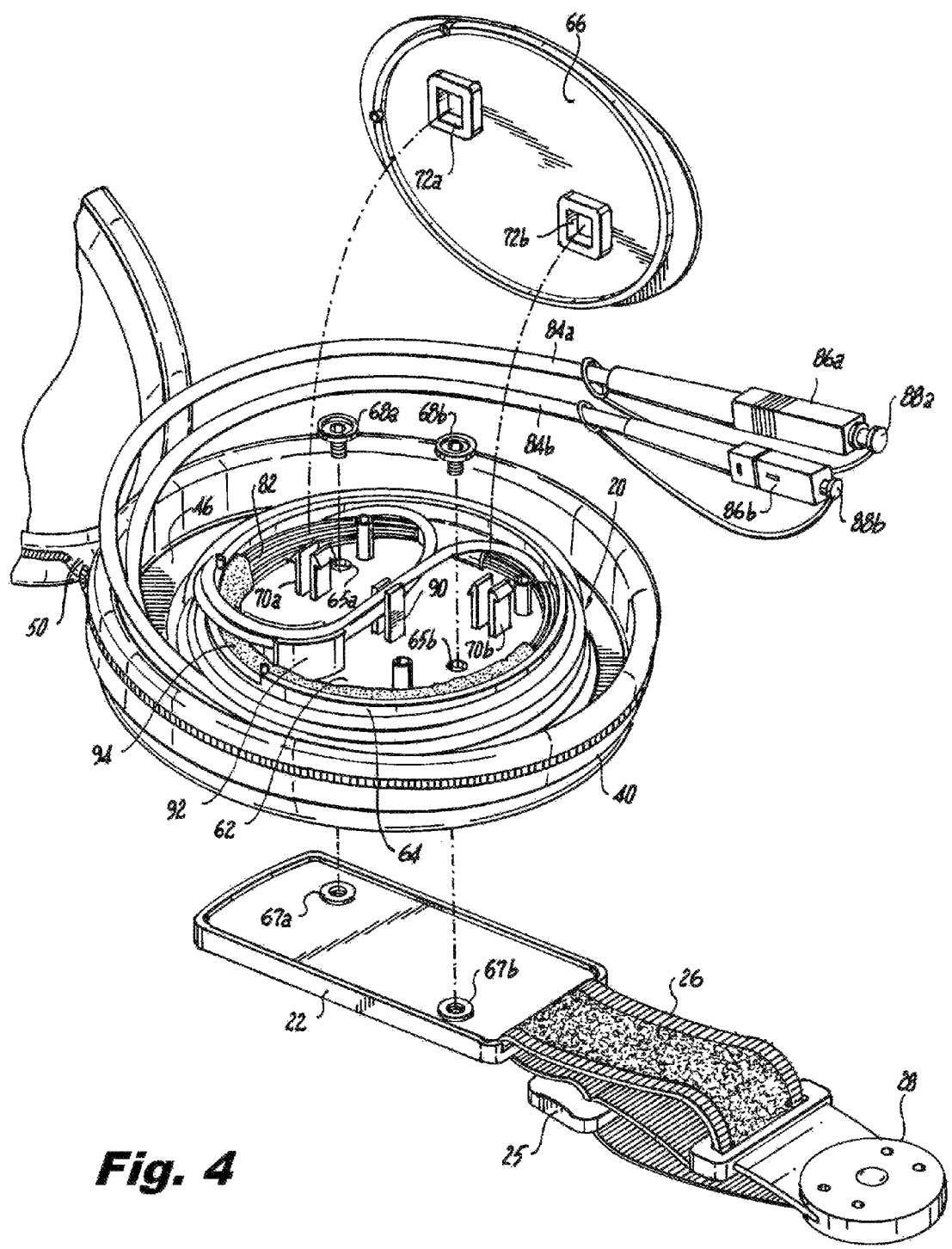
FIG. 4 is an exploded perspective view of the optical launch fiber carrying case of the subject invention, with parts separated for ease of illustration.

The surrounding edge 34 of the outer peripheral wall 32 of the cover portion 30 is operatively connected to the surrounding edge 44 of the outer peripheral wall 42 of base portion 40 by a flexible hinge 50, which is best seen in FIG. 4. A closure mechanism is provided for releasably securing the outer peripheral wall 32 of the cover portion 30 to the outer peripheral wall 42 of the base portion 40, to enclosure the launch fiber assembly 20 therein.

The closure mechanism is preferably a zippered closure mechanism that includes a first toothed portion 52 substantially circumscribing the edge 32 of the outer peripheral wall 34 of the cover portion 30 and a second toothed portion 54 substantially circumscribing the edge 42 of the outer peripheral wall 44 of the base portion 40. The closure mechanism also includes a slider 56 that begins on one side of the hinge 50 and end on the opposite side of the hinge 50. It is envisioned that alternative closure mechanisms or fasteners could be utilized to releasably secure the outer peripheral wall 34 of the cover portion 30 to the outer peripheral wall 44 of the base portion 40.

With continuing reference to FIG. 3, a stationary storage spool 60 is disposed within the inner cavity 45 of the base portion 40 of enclosure 18 to support the launch fiber assembly 20. The storage spool 60 is formed from injection molded components. More particularly, referring to FIGS. 4 and 5, the storage spool 60 includes a generally circular bottom plate 62 secured against the interior surface 46 of base portion 40, an upstanding annular wall 64 extending upwardly from the bottom plate 62 and a circular top plate 66 located above the annular wall 64 and secured to the bottom plate 62. The annular wall 64 is integrally formed with the bottom plate 62.

In accordance with a preferred embodiment of the subject invention, the bottom plate 62 of storage spool 60 is fixedly secured to the retainer 22 through the base portion 40 of enclosure 18 by a pair of threaded fasteners 68a, 68b, which project through corresponding apertures 65a, 65b in the bottom plate 62. The fasteners 68a, 68b threadably engage with two corresponding threaded bores 67a, 67b provided in retainer 22. Those skilled in the art will readily appreciate that alternative mechanical means may be employed to secure the bottom plate 62 of storage spool 60 to the retainer 22, such as, for example, rivets or the like. Moreover, it is envisioned that the storage spool 60 could be fixedly secured within the inner cavity 45 of the base portion 40 independent from the retainer 20, without departing from the spirit and scope of the subject disclosure.

The top plate 66 of storage spool 60 is secured to the bottom plate 62 by two sets of cantilevered engagement tangs 70a, 70b that project upwardly from the bottom plate 62 of the spool 60 to engage corresponding apertures 72a, 72b formed on the inner surface of the top plate 66 of spool 60.

Figure 5:
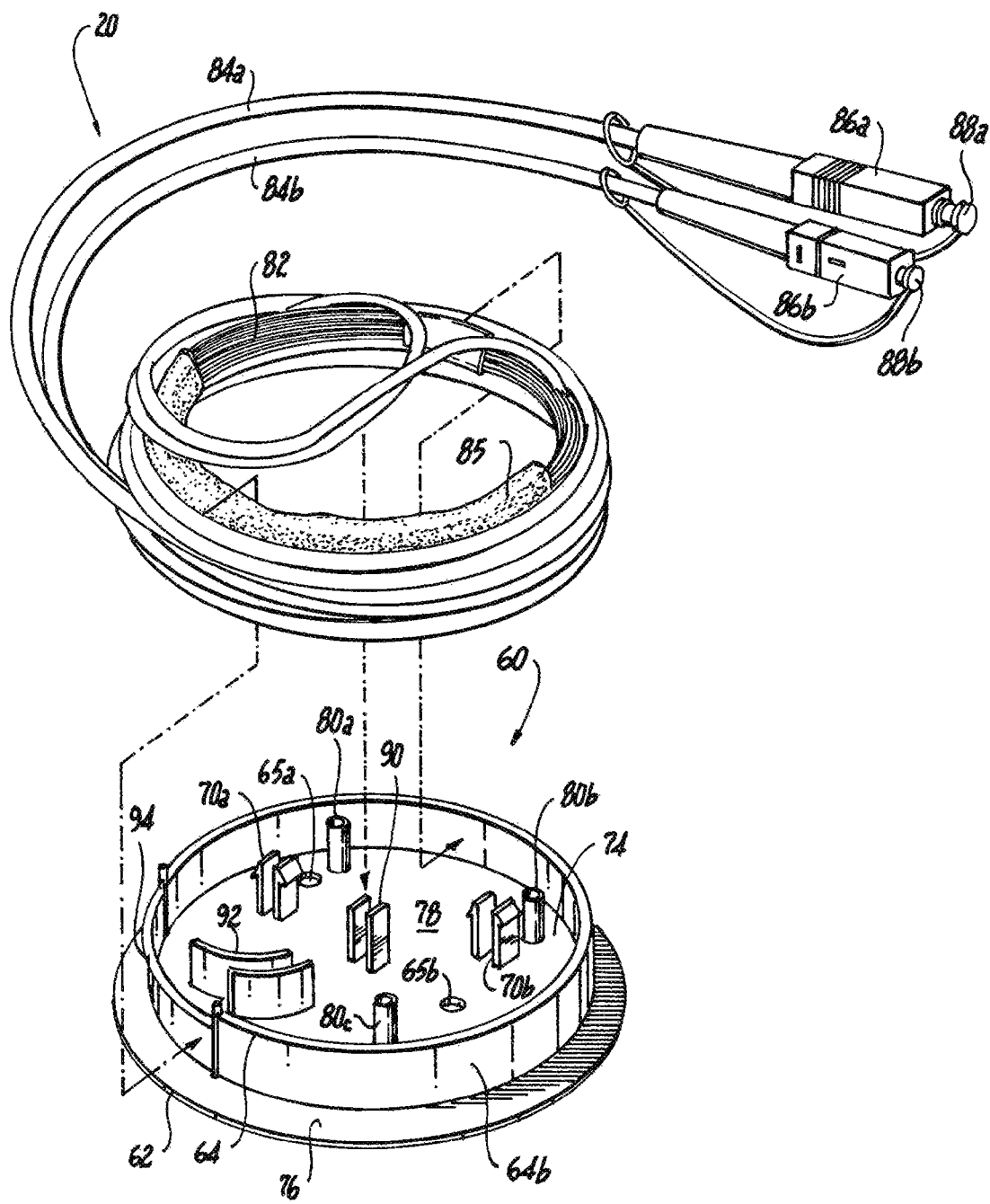
FIG. 5 is an exploded perspective view of the lower portion of the fiber storage spool removed from the base portion of the carrying case, and showing the entire launch fiber separated from the spool, including the central length of unjacketed optical fiber and the end lengths of jacketed optical fiber.

With continuing reference to FIGS. 4 and 5, together, the bottom plate 62, annular wall 64 and top plate 66 define an inner peripheral channel 74 and an outer peripheral channel 76. The inner peripheral channel 74 is dimensioned and configured to house and support a central length of unjacketed optical fiber 82, which forms part of the optical launch fiber assembly 20. Preferably, the central length of unjacketed optical fiber is bound with one or more lengths of tape 85 or a similar binding material. The central length of unjacketed optical fiber 82 can have a length ranging from between 150 ft. to over 2500 ft. or more, depending upon the application with which it is intended to be used.

The outer peripheral channel 76 is dimensioned and configured to house and support the two end lengths of jacketed optical fiber 84a and 84b, which form the remainder of the optical launch fiber assembly 20. Each end length has a respective connector 86a, 86b, on for connection with an OTDR device 14 and the other for connecting with a component 16 of an optical network, as illustrated in FIG. 1. Connectors 86a, 86b each include a respective dust cap 88a, 88b. The dust caps 88a, 88b are tethered to their respective end lengths so that they cannot easily be displaced in the field. The optical launch fiber assembly 20 could be continuously formed, whereby the central length 82 is continuous with the two end lengths 84a and 84b. Alternatively, the two end lengths 84a and 84b could be fused to the central length 82.

With continuing reference to FIG. 5, the inner peripheral channel 74 is defined in the inner chamber 78 of spool 60. More particularly, the inner peripheral channel 74 is formed between a radially inner surface 64a of the annular wall 64 and a plurality of circumferentially spaced apart upstanding posts 80a, 80b and 80c, which are located radially inward of the annular wall 64. The outer peripheral channel 76 is formed primarily by the radially outer surface 64b of annular wall 64, together with radially outer edge portion of the bottom and top plate 62 and 66.

Also formed within the inner chamber 78 of spool 60 are two sets of cable guides for handling the transitioning of the two end lengths of jacketed optical fiber 84a and 84b from the inner chamber 78 to the outer peripheral channel 76 of spool 60. The cable guides include a central guide channel 90 and a curved outer guide channel 92. The curved outer guide channel 92 feeds into an arcuate opening 94 formed in the annular wall 64 of spool 60. The arcuate opening 94 is dimensioned and configured to accommodate the passage of the two end lengths of jacketed optical fiber 84a, 84b from the inner chamber 78 of spool 60 to the outer peripheral channel 76 of spool 60.

While the portable carrying case for an optical launch fiber assembly of the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. An enclosure for an optical launch fiber assembly, comprising:
   a) a base portion defining an inner cavity and having an interior surface, an outer peripheral wall and an exterior surface; and
   b) a stationary storage spool disposed within the inner cavity of the base portion and defining an inner chamber for supporting a central length of unjacketed optical launch fiber and an outer peripheral channel for supporting two jacketed end lengths of the optical launch fiber.

2. An enclosure as recited in claim 1, further comprising a retainer operatively associated with the exterior surface of the base portion for securing the stationary spool against the interior surface of base portion within the inner cavity.

3. An enclosure as recited in claim 1, further comprising a cover portion having an outer peripheral wall.

4. An enclosure as recited in claim 3, wherein the outer peripheral wall of the cover portion is operatively connected to the outer peripheral wall of the base portion by a flexible hinge.

5. An enclosure as recited in claim 3, further comprising a closure mechanism for releasably securing the outer peripheral wall of the cover portion to the outer peripheral wall of the base portion.

6. An enclosure as recited in claim 5, wherein the closure mechanism is a zippered closure mechanism including a first toothed portion associated with the cover portion, a second toothed portion associated with the base portion, and a slider associated with the first and second toothed portions.

7. An enclosure as recited in claim 2, wherein the retainer includes an aperture for receiving a support belt to secure the enclosure to a supporting structure.

8. An enclosure as recited in claim 2, wherein the retainer is fastened to the spool through the base portion of the enclosure.

9. An enclosure as recited in claim 1, wherein the storage spool includes a bottom plate secured against the interior surface of the base portion, an annular wall extending upwardly from the bottom plate and a top plate above the annular wall and secured to the bottom plate.

10. An enclosure as recited in claim 9, wherein an inner peripheral channel is formed within the inner chamber of the spool for supporting the central length of unjacketed optical launch fiber.

11. An enclosure as recited in claim 10, wherein the inner peripheral channel is formed between a radially inner surface of the annular wall and a plurality of circumferentially spaced apart upstanding posts located radially inward of the annular wall.

12. An enclosure as recited in claim 10, wherein the outer peripheral channel is formed by a radially outer surface of the annular wall and radially outer portions of the top and bottom plates.

13. An enclosure as recited in claim 9, wherein the annular wall includes an arcuate opening for accommodating passage of the second portion of the launch cable from the inner chamber of the spool to the outer peripheral channel of the spool.

14. An enclosure as recited in claim 9, wherein sets of cantilevered engagement tangs project upwardly from the bottom plate of the spool to engage corresponding apertures formed in the top plate of the spool.

15. An enclosure for an optical launch fiber assembly, comprising:
   a) a base portion defining an inner cavity and having an interior surface, an outer peripheral wall and an exterior surface;
   b) a stationary storage spool fixedly secured to the inner surface of the base portion within the inner cavity, the storage spool having an annular wall forming an inner peripheral channel for supporting a central length of unjacketed optical launch fiber and an outer peripheral channel for supporting two end lengths of jacketed optical launch fiber; and
   c) a cover portion having an outer peripheral wall hingedly connected to the outer peripheral wall of the base portion.

16. An enclosure as recited in claim 15, further comprising a retainer operatively associated with the exterior surface of the base portion for securing the storage spool against the interior surface of base portion within the inner cavity.

17. An enclosure as recited in claim 15, further comprising a closure mechanism for releasably securing the outer peripheral wall of the cover portion to the outer peripheral wall of the base portion.

18. An enclosure as recited in claim 17, wherein the closure mechanism is a zippered closure mechanism including a first toothed portion associated with the cover portion, a second toothed portion associated with the base portion, and a slider associated with the first and second toothed portions.

19. An enclosure as recited in claim 16, wherein the retainer includes an aperture for receiving a support belt to secure the enclosure to a supporting structure.

20. An enclosure as recited in claim 16, wherein the retainer is fastened to the storage spool through the base portion of the enclosure.

21. An enclosure as recited in claim 16, wherein the storage spool includes a bottom plate secured against the interior surface of the base portion, an annular wall extending upwardly from the bottom plate and a top plate above the annular wall and secured to the bottom plate.

22. An enclosure as recited in claim 21, wherein an inner peripheral channel is formed within the inner chamber of the storage spool for supporting the central length of unjacketed optical launch fiber.

23. An enclosure as recited in claim 22, wherein the inner peripheral channel is formed between a radially inner surface of the annular wall and a plurality of circumferentially spaced apart upstanding posts located radially inward of the annular wall.

24. An enclosure as recited in claim 22, wherein the outer peripheral channel is formed by a radially outer surface of the annular wall and radially outer portions of the top and bottom plates.

25. An enclosure as recited in claim 24, wherein the annular wall includes an arcuate opening for accommodating passage of the second portion of the launch cable from the inner chamber of the spool to the outer peripheral channel of the spool.

26. An enclosure as recited in claim 21, wherein cantilevered engagement tangs project upwardly from the bottom plate of the spool to engage corresponding apertures formed in a front plate of the spool.

27. An enclosure as recited in claim 16, wherein the base portion and the cover portion are constructed from a thermoformed plastic material and the storage spool and retainer are formed from an injection molded plastic material.

* * * * *